(12) United States Patent
McCaffrey

(10) Patent No.: US 12,312,999 B1
(45) Date of Patent: May 27, 2025

(54) SEPARATING AIRFLOWS WITHIN A TURBINE ENGINE

(71) Applicant: RTX Corporation, Farmington, CT (US)

(72) Inventor: Michael G. McCaffrey, Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/400,368

(22) Filed: Dec. 29, 2023

(51) Int. Cl.
*F23R 3/04* (2006.01)
*F02C 7/05* (2006.01)

(52) U.S. Cl.
CPC ............ *F02C 7/05* (2013.01); *F23R 3/04* (2013.01); *F05D 2260/607* (2013.01)

(58) Field of Classification Search
CPC .... F02C 7/05; F02C 7/052; F23R 3/04; F05D 2260/607; F04D 29/54
See application file for complete search history.

(56) References Cited

U.S. PATENT DOCUMENTS

| | | | |
|---|---|---|---|
| 3,394,543 A * | 7/1968 | Slattery | F23R 3/60 60/785 |
| 3,720,045 A | 3/1973 | Murphy | |
| 6,334,297 B1 * | 1/2002 | Dailey | F23R 3/04 60/785 |
| 8,082,738 B2 * | 12/2011 | Cornelius | F23R 3/005 60/751 |
| 10,724,437 B2 | 7/2020 | Atsuchi | |
| 11,608,782 B2 | 3/2023 | Menheere | |
| 2004/0011043 A1 * | 1/2004 | Pidcock | F23R 3/04 60/751 |

* cited by examiner

*Primary Examiner* — Steven M Sutherland
(74) *Attorney, Agent, or Firm* — Getz Balich LLC

(57) ABSTRACT

An assembly is provided for a turbine engine. This assembly includes an engine core extending axially along an axis. The engine core includes a compressor section, a combustor, a diffuser structure, a diffuser plenum and a plurality of separators. The combustor is arranged within the diffuser plenum. The combustor includes a combustion chamber and a combustor wall between the combustion chamber and the diffuser plenum. The diffuser structure includes a plurality of diffuser passages. Each of the diffuser passages fluidly couples the compressor section to a respective one of the separators. Each of the separators includes a first outlet into the diffuser plenum and a second outlet into the combustion chamber.

13 Claims, 9 Drawing Sheets

SEPARATING AIRFLOWS WITHIN A TURBINE ENGINE

BACKGROUND OF THE DISCLOSURE

1. Technical Field

This disclosure relates generally to an aircraft and, more particularly, to separating airflows within an aircraft engine.

2. Background Information

Various systems and methods are known in the art for separating airflows within an aircraft engine. While these known systems and methods have various benefits, there is still room in the art for improvement.

SUMMARY OF THE DISCLOSURE

According to an aspect of the present disclosure, an assembly is provided for a turbine engine. This assembly includes an engine core extending axially along an axis. The engine core includes a compressor section, a combustor, a diffuser structure, a diffuser plenum and a plurality of separators. The combustor is arranged within the diffuser plenum. The combustor includes a combustion chamber and a combustor wall between the combustion chamber and the diffuser plenum. The diffuser structure includes a plurality of diffuser passages. Each of the diffuser passages fluidly couples the compressor section to a respective one of the separators. Each of the separators includes a first outlet into the diffuser plenum and a second outlet into the combustion chamber.

According to another aspect of the present disclosure, another assembly is provided for a turbine engine. This assembly includes an engine core extending axially along an axis. The engine core includes a compressor section, a combustor, a diffuser structure, a diffuser plenum and an air-debris separator. The compressor section includes a rotor with a mixed flow compressor stage. The combustor is arranged within the diffuser plenum. The combustor includes a combustion chamber and a combustor wall between the combustion chamber and the diffuser plenum. The diffuser structure includes a diffuser passage fluidly coupling the compressor section to the separator. The diffuser passage projects radially away from the mixed flow compressor stage. The air-debris separator includes a first airflow passage and a second airflow passage. The first airflow passage is fluidly coupled with the diffuser plenum. The second airflow passage is fluidly coupled with the combustion chamber.

According to still another aspect of the present disclosure, another assembly is provided for a turbine engine. This assembly includes an engine core extending axially along an axis. The engine core includes a compressor section, a combustor, a diffuser structure, a diffuser plenum and an air-debris separator. The combustor is arranged within the diffuser plenum. The combustor includes a combustion chamber and a combustor wall between the combustion chamber and the diffuser plenum. The combustor wall includes a dilution aperture extending through the combustor wall to the combustion chamber. The diffuser structure includes a diffuser passage. The diffuser passage fluidly couples the compressor section to the air-debris separator. The diffuser passage projects radially outward away from the compressor section towards the air-debris separator. The air-debris separator includes a dirty airflow passage. The dirty airflow passage is fluidly coupled with the combustion chamber through the dilution aperture.

The compressor section may be configured as or otherwise include a mixed flow compressor rotor upstream of and next to the diffuser structure.

The air-debris separator may also include a clean airflow passage. The clean airflow passage may be fluidly coupled with the diffuser plenum.

The second airflow passage may be fluidly coupled with the combustion chamber through a dilution aperture extending through the combustor wall.

The air-debris separator may be arranged in the diffuser plenum radially next to the combustor wall.

The compressor section may include a mixed flow compressor rotor. The mixed flow compressor rotor may be configured to output compressed air, along a trajectory with an axial component and a radial outward component, into the diffuser passages.

Each of the diffuser passages may project radially outward away from the compressor section.

The separators may include a first separator. The first separator may be arranged in the diffuser plenum radially outboard of the combustor.

The separators may include a first separator. The first separator may be configured as or otherwise include a cyclonic separator.

The diffuser passages may include a first diffuser passage. The separators may include a first separator. The first separator may be configured to separate compressed core air received from the compressor section through the first diffuser passage into a first airflow and a second airflow. The first separator may be configured to direct the first airflow into the diffuser plenum through the first outlet. The first separator may be configured to direct the second airflow into the combustion chamber through the second outlet.

When the compressed core air received by the first separator from the compressor section includes debris, the first separator may be configured to divert at least a majority of the debris away from the first airflow and into the second airflow to flow with the second airflow into the combustion chamber through the second outlet.

The separators may include a first separator. The first separator may include a center body, an inner tube, an outer tube, a first airflow passage and a second airflow passage. An upstream portion of the center body may extend longitudinally in a bore of the outer tube. A downstream portion of the center body may project longitudinally into a bore of the inner tube. The outer tube may extend longitudinally along and may circumscribe the inner tube. The first airflow passage may be formed within the inner tube. The first airflow passage may be fluidly coupled to the diffuser plenum through the first outlet. The second airflow passage may be formed between the inner tube and the outer tube. The second airflow passage may be fluidly coupled to the combustion chamber through the second outlet.

The first separator may also include one or more vanes connecting the center body to the outer tube.

The first separator may also include one or more vanes connecting the center body to the inner tube.

The combustor wall may include a plurality of dilution apertures extending through the combustor wall to the combustion chamber. Each of the separators may include an outlet tube mated with a respective one of the dilution apertures. The outlet tube may include the second outlet.

The combustor may also include a bulkhead disposed axially between the compressor section and the combustion chamber.

The combustor may also include a bulkhead with the combustion chamber disposed axially between the compressor section and the bulkhead.

The assembly may also include a propulsor rotor operatively coupled to the engine core.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
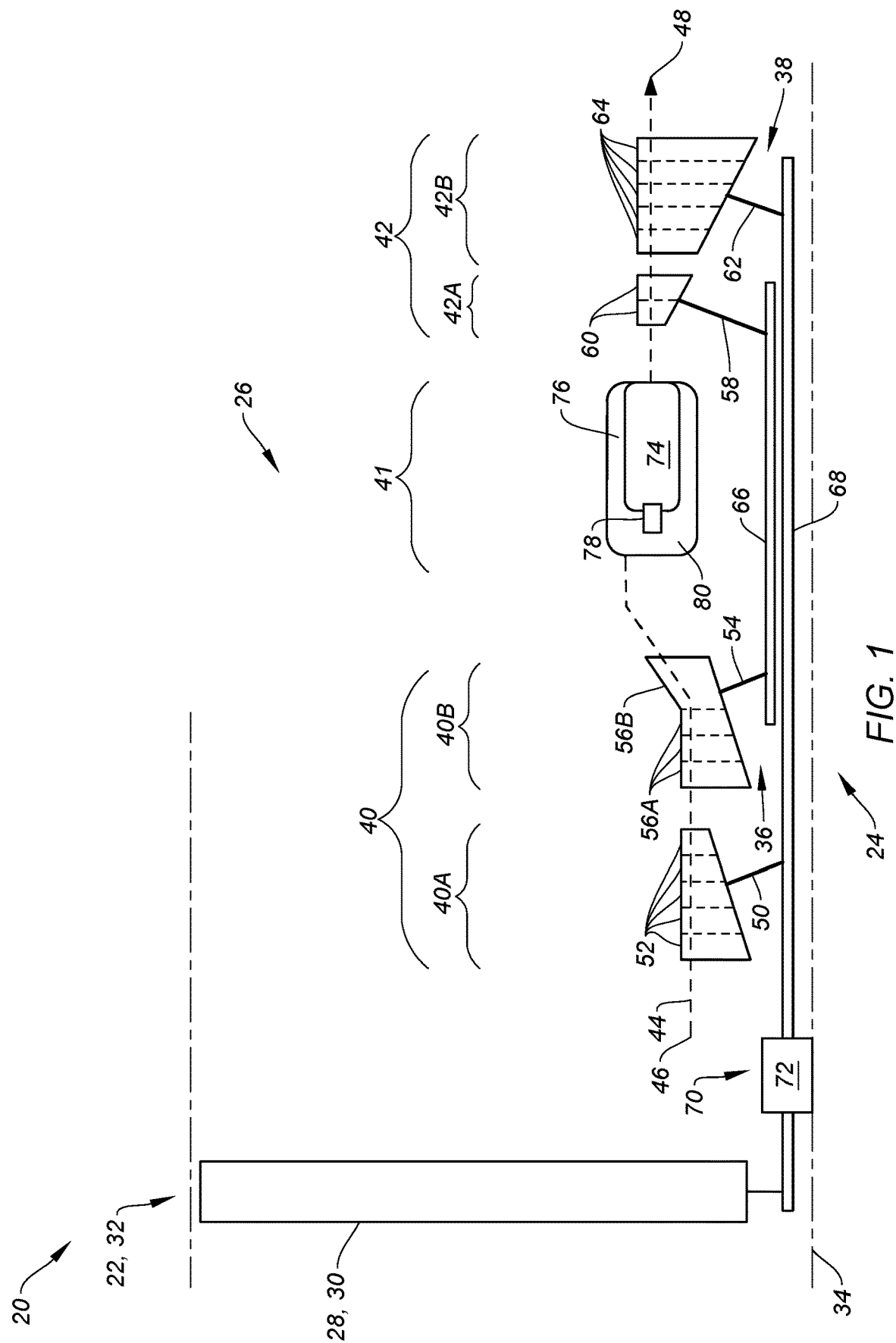
FIG. 1 is a partial schematic illustration of an aircraft system.

FIG. 1 illustrates a system 20 for an aircraft. The aircraft may be an airplane, a helicopter, a drone (e.g., an unmanned aerial vehicle (UAV)) or any other manned or unmanned aerial vehicle or system. The aircraft system 20 may be configured as, or otherwise included as part of, a propulsion system for the aircraft. The aircraft system 20 may also or alternatively be configured as, or otherwise included as part of, an electrical power system for the aircraft. The aircraft system 20 of FIG. 1 includes a mechanical load 22 and a core 24 of a turbine engine 26.

The mechanical load 22 may be configured as or otherwise include a rotor 28 mechanically driven and/or otherwise powered by the engine core 24. This driven rotor 28 may be a bladed propulsor rotor 30 (e.g., an air mover) where the aircraft system 20 is (or is part of) the aircraft propulsion system. The propulsor rotor 30 includes a plurality of rotor blades arranged circumferentially around and connected to a rotor disk or hub. The propulsor rotor 30 may be an open (e.g., un-ducted) propulsor rotor or a ducted propulsor rotor. Examples of the open propulsor rotor include a propeller rotor for a turboprop propulsion system, a rotorcraft rotor (e.g., a main helicopter rotor) for a turboshaft propulsion system, a propfan rotor for a propfan propulsion system, and a pusher fan rotor for a pusher fan propulsion system. An example of the ducted propulsor rotor is a fan rotor for a turbofan propulsion system. The present disclosure, of course, is not limited to the foregoing exemplary propulsor rotor arrangements. Moreover, the driven rotor 28 may alternatively be a generator rotor of an electric power generator where the aircraft system 20 is (or is part of) the aircraft power system; e.g., an auxiliary power unit (APU) for the aircraft. However, for ease of description, the mechanical load 22 may be generally described below as a propulsor section 32 of the turbine engine 26 and the driven rotor 28 may be generally described as the propulsor rotor 30 within the propulsor section 32.

The engine core 24 extends axially along an axis 34 between an upstream, forward end of the engine core 24 and a downstream, aft end of the engine core 24. This axis 34 may be a centerline axis of the turbine engine 26 and/or its engine core 24. The axis 34 may also or alternatively be a rotational axis of one or more rotating assemblies (e.g., 36 and 38) of the turbine engine 26 and its engine core 24. The engine core 24 includes a compressor section 40, a combustor section 41, a turbine section 42 and a core flowpath 44. The compressor section 40 of FIG. 1 includes a low pressure compressor (LPC) section 40A and a high pressure compressor (HPC) section 40B. The turbine section 42 of FIG. 1 includes a high pressure turbine (HPT) section 42A and a low pressure turbine (LPT) section 42B. The core flowpath 44 extends sequentially through the LPC section 40A, the HPC section 40B, the combustor section 41, the HPT section 42A and the LPT section 42B from an airflow inlet 46 into the core flowpath 44 to a combustion products exhaust 48 from the core flowpath 44. The core inlet 46 may be disposed at (e.g., on, adjacent or proximate) the forward end of the engine core 24, and the core exhaust 48 may be disposed at the aft end of the engine core 24.

The LPC section 40A includes a bladed low pressure compressor (LPC) rotor 50. The LPC rotor 50 includes one or more sets of compressor blades (schematically shown) arranged circumferentially around one or more rotor disks, where the compressor blades in each set are connected to and project out from a respective one of the rotor disks. Here, the LPC rotor 50 and its multiple sets of the compressor blades provide the LPC section 40A with multiple compressor stages 52. Each of these compressor stages 52 may be configured as an axial flow compressor stage, and the LPC rotor 50 may be configured as an axial flow compressor rotor. Herein, the term "axial flow" may describe a rotor stage and/or a rotor which (A) receives an incoming flow along a trajectory with an axial component and without (or with a very small) radial component and (B) outputs an outgoing flow along a trajectory with an axial component and without a (or with a very small) radial component.

The LPC rotor 50 of FIG. 1 is disposed in and arranged longitudinally along the core flowpath 44 between the core inlet 46 and the HPC section 40B. The compressor blades, for example, are disposed in and extend across the core flowpath 44. Each rotor disk is disposed adjacent (e.g., radially below) the core flowpath 44. The present disclosure, however, is not limited to such an exemplary LPC rotor configuration.

The HPC section 40B includes a bladed high pressure compressor (HPC) rotor 54. The HPC rotor 54 includes one or more sets of compressor blades (schematically shown) arranged circumferentially around one or more rotor disks, where the compressor blades in each set are connected to and project out from a respective one of the rotor disks. Here, the HPC rotor 54 and its multiple sets of the compressor blades provide the HPC section 40B with multiple compressor stages 56A and 56B (generally referred to as "56"). One or more of these compressor stages 56A may each be configured as an axial flow compressor stage. A final (e.g., downstream-most) compressor stage 56B of the HPC rotor 54 may be configured as a mixed flow compressor stage; see also FIG. 2. Herein, the term "mixed flow" may describe a compressor rotor stage and/or a compressor rotor which (A) receives an incoming flow along a trajectory with an axial component and without a (or with a very small) radial component and (B) outputs an outgoing flow along a trajectory with an axial component and with a radial component. A ratio of the axial component to the radial component may be between 2-to-1 and 1-to-2 (e.g., a 1-to-1 ratio). The present disclosure, of course, is not limited to such an exemplary relationship. Here, the HPC rotor 54 is configured as a dual axial flow/mixed flow compressor rotor. However, it is contemplated one or more or all of the upstream axial flow compressor stages 56A may be omitted. The HPC rotor 54, for example, may include the single mixed flow compressor stage 56B, and the HPC rotor 54 may be configured as a mixed flow compressor rotor. Moreover, it is contemplated the mixed flow compressor stage 56B may be replaced by a radial flow compressor stage. Herein, the term "radial flow" may describe a compressor rotor stage and/or a compressor rotor which (A) receives an incoming flow along a trajectory with an axial component and without (or with a very small) radial component and (B) outputs an outgoing flow along a trajectory with a radial component and without a (or with a very small) axial component.

The HPC rotor 54 is disposed in and arranged longitudinally along the core flowpath 44 between the LPC section 40A and the combustor section 41. The compressor blades, for example, are disposed in and extend across the core flowpath 44. Each rotor disk is disposed adjacent (e.g., radially below) the core flowpath 44. The present disclosure, however, is not limited to the foregoing exemplary HPC rotor configurations.

The HPT section 42A includes a bladed high pressure turbine (HPT) rotor 58. The HPT rotor 58 includes one or more sets of turbine blades (schematically shown) arranged circumferentially around one or more rotor disks, where the turbine blades in each set are connected to and project out from a respective one of the rotor disks. Here, the HPT rotor 58 and its multiple sets of the turbine blades provide the HPT section 42A with multiple turbine stages 60. Each of these turbine stages 60 may be configured as an axial flow turbine stage, and the HPT rotor 58 may be configured as an axial flow turbine rotor.

The HPT rotor 58 is disposed in and arranged longitudinally along the core flowpath 44 between the combustor section 41 and the LPT section 42B. The turbine blades, for example, are disposed in and extend across the core flowpath 44. Each rotor disk is disposed adjacent (e.g., radially below) the core flowpath 44. The present disclosure, however, is not limited to such an exemplary HPT rotor configuration.

The LPT section 42B includes a bladed low pressure turbine (LPT) rotor 62. The LPT rotor 62 includes one or more sets of turbine blades (schematically shown) arranged circumferentially around one or more rotor disks, where the turbine blades in each set are connected to and project out from a respective one of the rotor disks. Here, the LPT rotor 62 and its multiple sets of the turbine blades provide the LPT section 42B with multiple turbine stages 64. Each of these turbine stages 64 may be configured as an axial flow turbine stage, and the LPT rotor 62 may be configured as an axial flow turbine rotor.

The LPT rotor 62 is disposed in and arranged longitudinally along the core flowpath 44 between the HPT section 42A and the core exhaust 48. The turbine blades, for example, are disposed in and extend across the core flowpath 44. Each rotor disk is disposed adjacent (e.g., radially below) the core flowpath 44. The present disclosure, however, is not limited to such an exemplary LPT rotor configuration.

The HPC rotor 54 is coupled to and rotatable with the HPT rotor 58. The HPC rotor 54 of FIG. 1, for example, is connected to the HPT rotor 58 by a high speed shaft 66. At least (or only) the HPC rotor 54, the HPT rotor 58 and the high speed shaft 66 collectively form the high speed rotating assembly 36; e.g., a high speed spool of the engine core 24. The LPC rotor 50 is coupled to and rotatable with the LPT rotor 62. The LPC rotor 50 of FIG. 1, for example, is connected to the LPT rotor 62 by a low speed shaft 68. At least (or only) the LPC rotor 50, the LPT rotor 62 and the low speed shaft 68 collectively form the low speed rotating assembly 38; e.g., a low speed spool of the engine core 24. This low speed rotating assembly 38 is further coupled to the driven rotor 28 (e.g., the propulsor rotor 30) through a drivetrain 70. The drivetrain 70 may be configured as a geared drivetrain, where a geartrain 72 (e.g., a transmission, a speed change device, an epicyclic geartrain, etc.) is disposed between and operatively couples the driven rotor 28 to the low speed rotating assembly 38 and its LPT rotor 62. With this arrangement, the driven rotor 28 may rotate at a different (e.g., slower) rotational velocity than the low speed rotating assembly 38 and its LPT rotor 62. However, the drivetrain 70 may alternatively be configured as a direct drive drivetrain, where the geartrain 72 is omitted. With this arrangement, the driven rotor 28 rotates at a common (the same) rotational velocity as the low speed rotating assembly 38 and its LPT rotor 62. Referring again to FIG. 1, each of the rotating assemblies 36, 38 and its members may be rotatable about the axis 34.

During operation of the turbine engine 26, air may be directed across the driven rotor 28 (e.g., the propulsor rotor 30) and into the engine core 24 through the core inlet 46. This air entering the core flowpath 44 may be referred to as "core air". The core air is compressed by the LPC rotor 50 and the HPC rotor 54 and directed into a combustion chamber 74 (e.g., an annular combustion chamber) within a combustor 76 (e.g., an annular combustor) of the combustor section 41. Fuel is injected into the combustion chamber 74 by one or more fuel injectors 78 and mixed with the compressed core air to provide a fuel-air mixture. This fuel-air mixture is ignited and combustion products thereof flow through and sequentially drive rotation of the HPT rotor 58 and the LPT rotor 62 about the axis 34. The rotation of the HPT rotor 58 and the LPT rotor 62 respective drive rotation of the HPC rotor 54 and the LPC rotor 50 and, thus, the compression of the air received from the core inlet 46. The rotation of the LPT rotor 62 also drives rotation of the driven rotor 28. Where the driven rotor 28 is configured as the propulsor rotor 30, the rotation of that propulsor rotor 30 may propel additional air (e.g., outside air, bypass air, etc.) outside of the engine core 24 to provide aircraft thrust and/or lift. Where the driven rotor 28 is configured as the generator rotor, the rotation of that generator rotor may facilitate generation of electricity.

Figure 2:
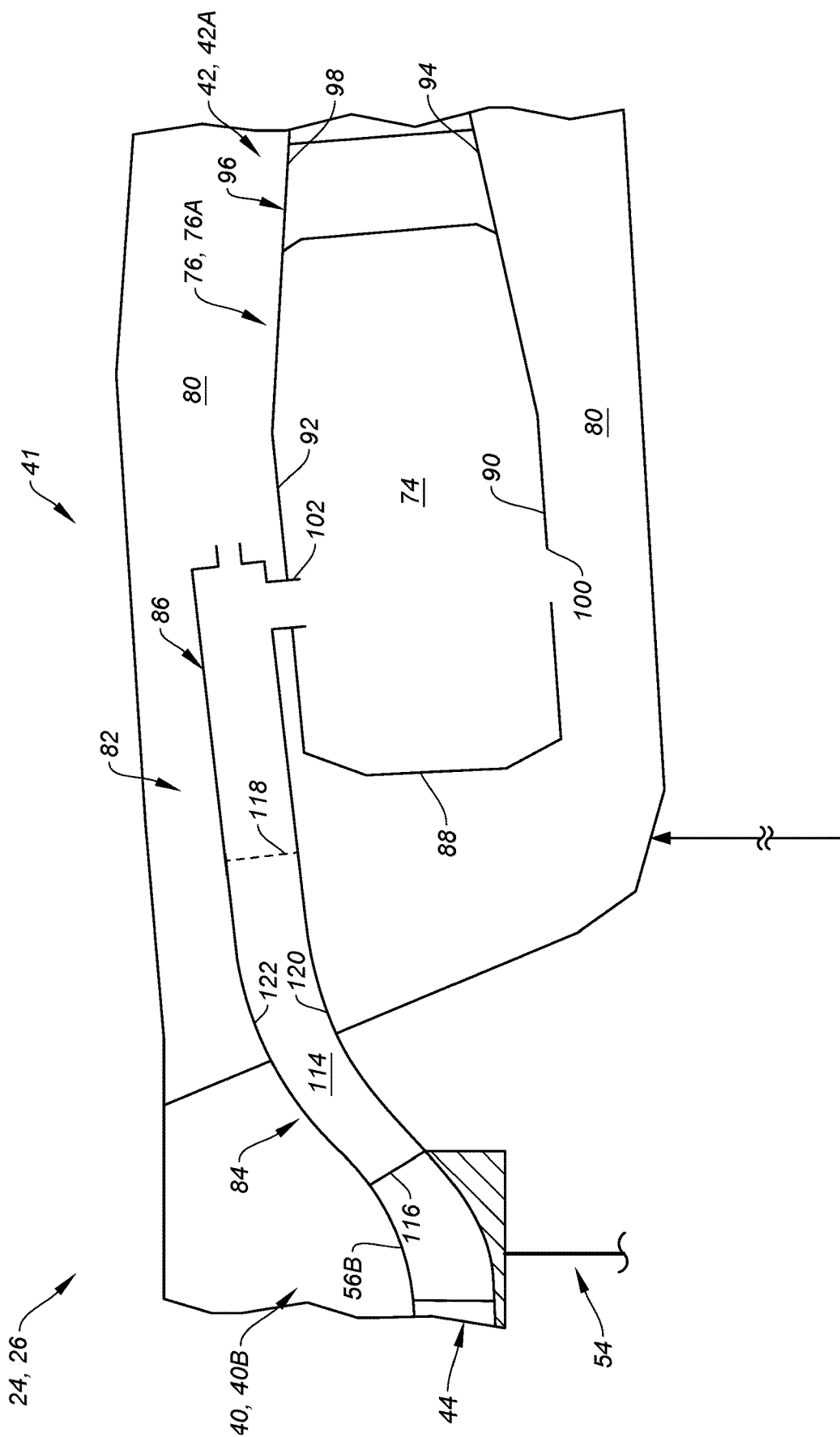
FIG. 2 is a schematic illustration of a portion of the aircraft system between a compressor section and a turbine section.

FIG. 2 illustrates a portion of the turbine engine 26 between (A) the compressor section 40 and its HPC section 40B and (B) the turbine section 42 and its HPT section 42A. Within this portion of the turbine engine 26, the combustor 76 is disposed within a diffuser plenum 80 and an air system 82 fluidly couples the HPC section 40B to the combustor 76 and the surrounding diffuser plenum 80. This air system 82 of FIG. 2 includes a diffuser structure 84 and one or more air-debris separators 86.

The combustor 76 of FIG. 2 includes an annular combustor bulkhead wall 88, a tubular inner combustor wall 90, and a tubular outer combustor wall 92. The bulkhead wall 88 of FIG. 2 extends radially between and to the inner combustor wall 90 and the outer combustor wall 92. The bulkhead wall 88 may be connected (e.g., mechanically fastened or otherwise attached) to the inner combustor wall 90 and/or the outer combustor wall 92. Each combustor wall 90, 92 projects axially along the axis 34 out from the bulkhead wall 88 towards the HPT section 42A. The inner combustor wall 90 of FIG. 2, for example, projects axially to and may be connected to an inner platform 94 of a downstream stator vane array 96 (e.g., a turbine inlet nozzle) in the HPT section 42A. The outer combustor wall 92 of FIG. 2 projects axially to and may be connected to an outer platform 98 of the stator vane array 96. The combustion chamber 74 is thereby formed by and extends radially within the combustor 76 between and to the inner combustor wall 90 and the outer combustor wall 92. The combustion chamber 74 is formed by and extends axially (in an upstream direction along the core flowpath 44) into the combustor 76 from the stator vane array 96 to the bulkhead wall 88. The combustion chamber 74 also extends within the combustor 76 circumferentially about (e.g., completely around) the axis 34. With this arrangement, each wall 88, 90, 92 of the combustor 76 is disposed between, forms a peripheral boundary of and fluidly separates the combustion chamber 74 and the diffuser plenum 80.

Figure 3:
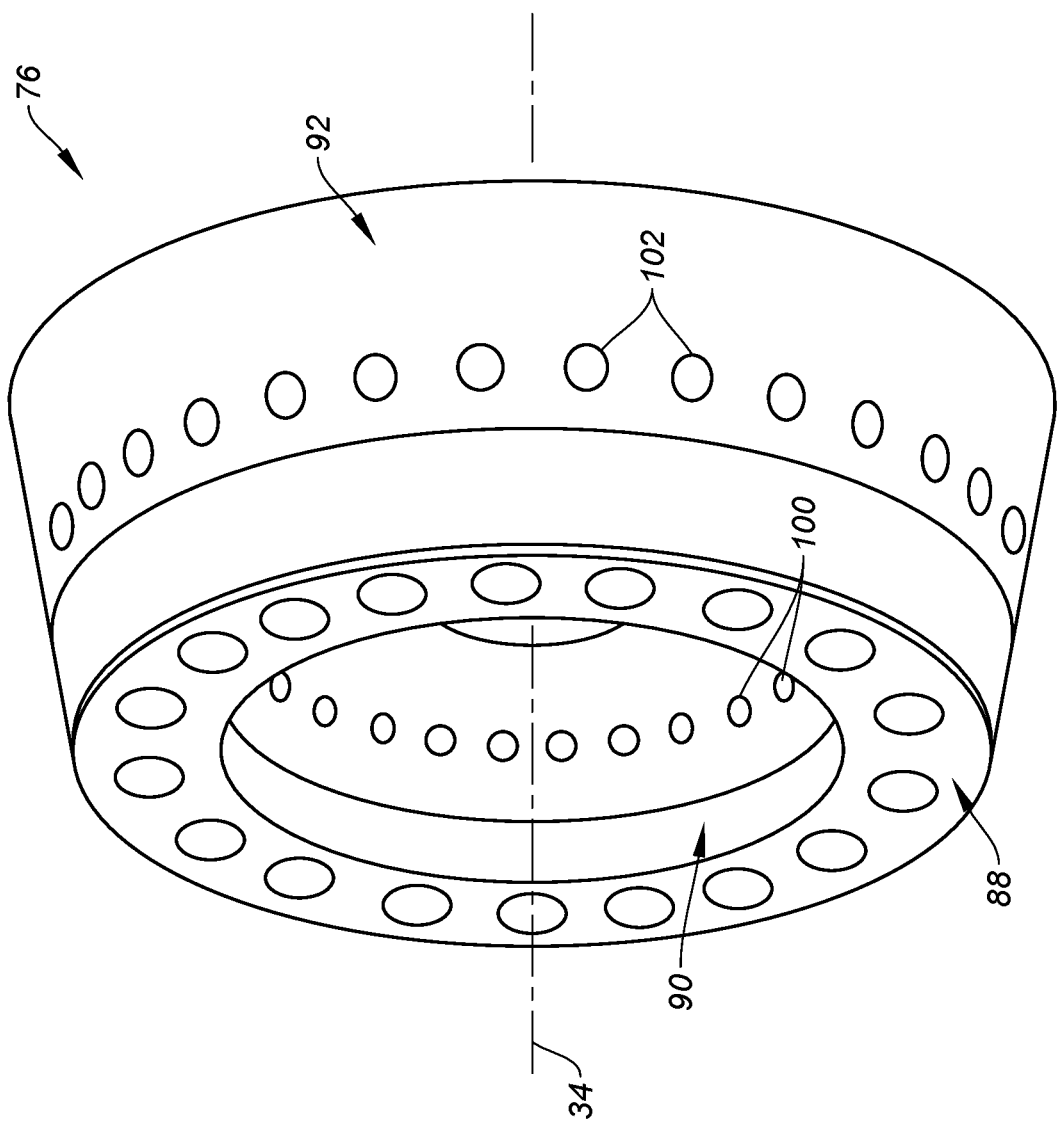
FIG. 3 is a perspective schematic illustration of a combustor.

Referring to FIG. 3, each combustor wall 90, 92 may include one or more dilution apertures 100, 102 (e.g., quench apertures) arranged circumferentially about the axis 34 in an array; e.g., a circular array. Referring to FIG. 2, each dilution aperture 100, 102 extends (e.g., radially) through the respective combustor wall 90, 92 to the combustion chamber 74. Each combustor wall 90, 92 may also include (or may not include) one or more cooling apertures (not shown for clarity of illustration; e.g., effusion aperture, cooling slots, etc. By contrast to the dilution apertures 100, 102, each cooling aperture may have a flow area (e.g., a cross-sectional area) which is significantly smaller than (e.g., 5×, 10×, 15×, 20× smaller than) a flow area (e.g., a cross-sectional area) of each dilution aperture 100, 102. Moreover, whereas the cooling apertures (when provided) are configured to facilitate cooling (e.g., film cooling) of a hot side of the respective combustor wall 90, 92, the dilution apertures 100, 102 may be provided to tune combustion of the fuel-air mixture within the combustion chamber 74. The dilution apertures 100, 102, for example, may direct compressed air into the combustion chamber 74 to stoichiometrically lean (e.g., quench) the combustion products.

Figure 4:
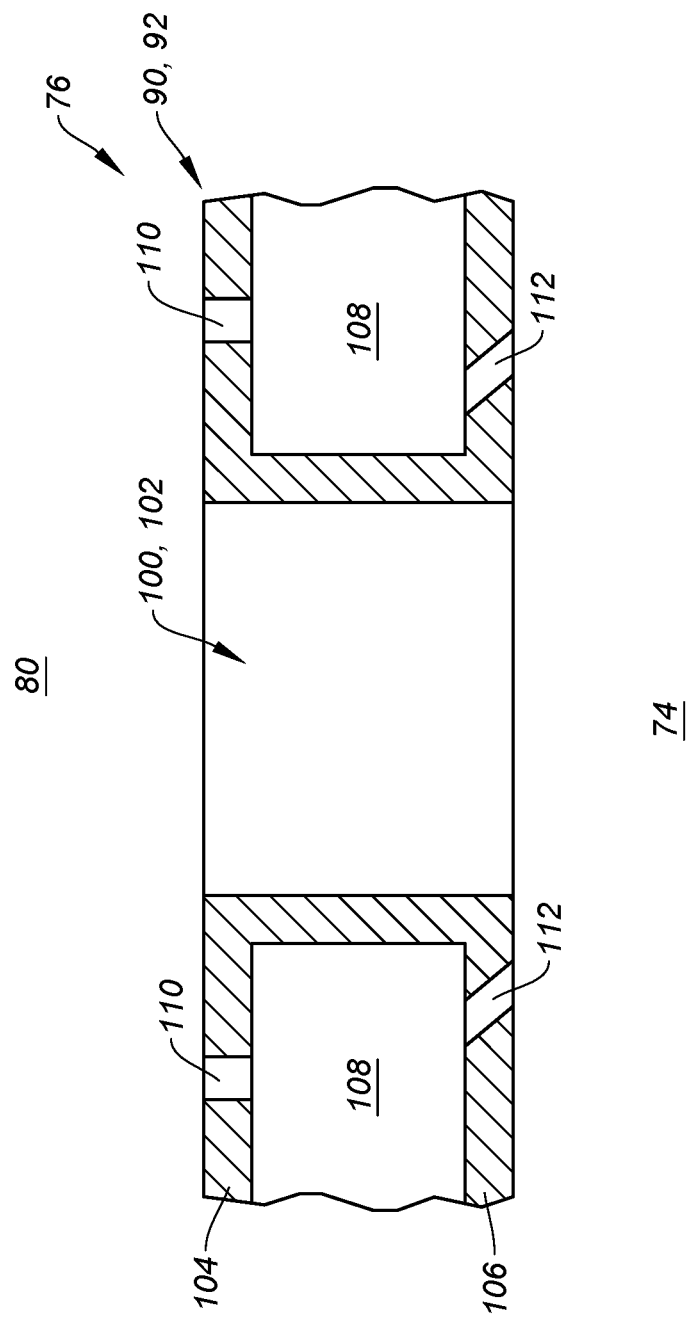
FIG. 4 is a partial sectional illustration of a multi-layered combustor wall.

Each of the combustor walls 90, 92 may be configured as a single layer combustor wall. Alternatively, any one or more of the combustor walls 90 and/or 92 may each be configured as a multi-layer combustor wall; e.g., a hollow, dual-walled structure. For example, referring to FIG. 4, each combustor wall 90, 92 may include a combustor wall shell 104, a combustor wall heat shield 106 (e.g., a liner) and one or more combustor wall cooling cavities 108 (e.g., impingement cavities) formed by and (e.g., radially) between the shell 104 and the heat shield 106. Each cooling cavity 108 may be fluidly coupled with the diffuser plenum 80 through one or more shell cooling apertures 110 in the shell 104; e.g., impingement apertures. Each cooling cavity 108 may be fluidly coupled with the combustion chamber 74 through one or more heat shield cooling apertures 112 in the heat shield 106; e.g., effusion apertures. Here, the dilution apertures 100, 102 are fluidly discrete from the cooling cavities 108, and each of the dilution apertures 100, 102 extends through the both the shell 104 and the heat shield 106; e.g., through an entire thickness of the respective combustor wall 90, 92.

Figure 5:
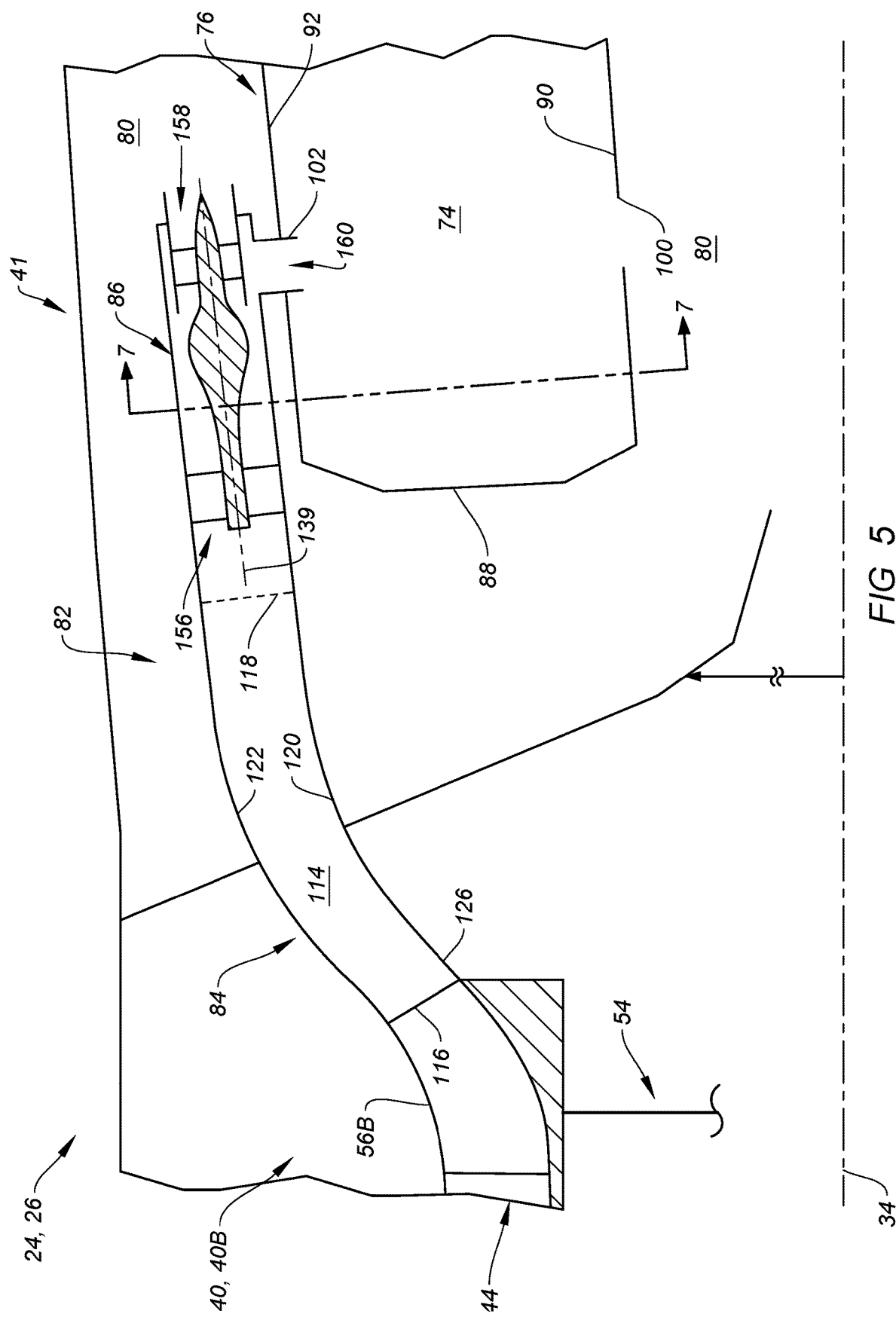
FIG. 5 is a schematic illustration of a portion of the aircraft system at an air system.
Figure 6:
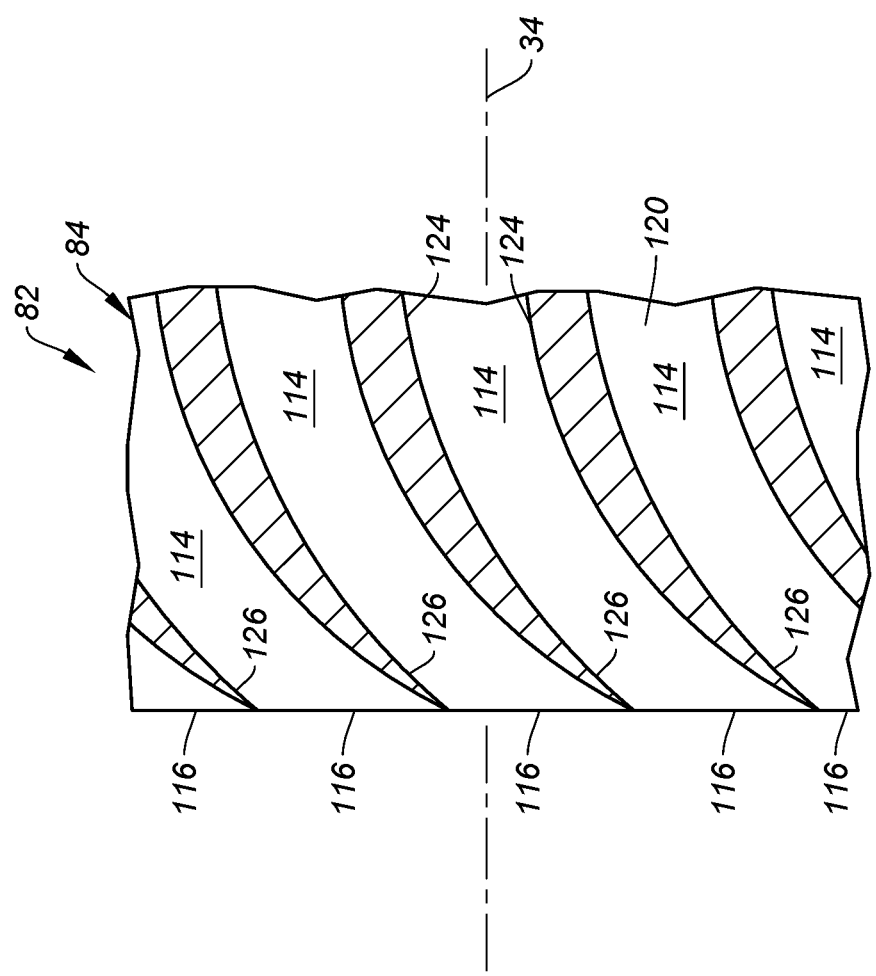
FIG. 6 is a sectional illustration of a portion of a diffuser structure.

Referring to FIG. 5, the diffuser structure 84 includes one or more diffuser passages 114. These diffuser passages 114 are arranged circumferentially about the axis 34 in an array; e.g., a circular array. This array of diffuser passages 114 may axially overlap and circumscribe a downstream portion of the HPC rotor 54 and its final mixed flow compressor stage 56B. Each of the diffuser passages 114 extends longitudinally from an inlet 116 into the respective diffuser passage 114 to an outlet 118 from the respective diffuser passage 114. Here, an upstream section of each diffuser passage 114 of FIG. 5 projects radially out from (or away from) the HPC section 40B and its HPC rotor 54 as that diffuser passage 114 extends longitudinally from its diffuser passage inlet 116 towards its diffuser passage outlet 118 (or is otherwise less angularly offset from the axis 34). Each diffuser passage 114 may then turn inwards such that a downstream section of each diffuser passage 114 of FIG. 5 extends substantially axially to its diffuser passage outlet 118. Each diffuser passage 114 extends radially between and to an inner passage wall 120 and an outer passage wall 122. The inner passage wall 120 forms a radial inner peripheral boundary of the respective diffuser passage 114. The outer passage wall 122 forms a radial outer peripheral boundary of the respective diffuser passage 114. Referring to FIG. 6, each diffuser passage 114 also extends laterally (e.g., circumferentially partially about the axis 34) between opposing sidewalls 124 of the respective diffuser passage 114.

Referring to FIG. 5, each diffuser passage inlet 116 is disposed downstream of the HPC rotor 54. Each diffuser passage inlet 116 of FIG. 5, for example, is disposed radially outboard of, axially overlaps and may be next to (e.g., adjacent) the downstream portion of the HPC rotor 54 and its final mixed flow compressor stage 56B. Referring to FIG. 6, each circumferentially neighboring (e.g., adjacent) pair of the diffuser passage inlets 116 may be separated by a respective splitter 126; e.g., a diffuser wedge. Each diffuser passage outlet 118 of FIG. 5 is disposed upstream of and adjacent a respective one of the air-debris separators 86. Here, each diffuser passage outlet 118 is located radially outboard of and axially aft of the diffuser passage inlet 116 of the same diffuser passage 114. The diffuser passage outlet 118 may also be circumferentially offset from the diffuser passage inlet 116 of the same diffuser passage 114.

Figure 7:
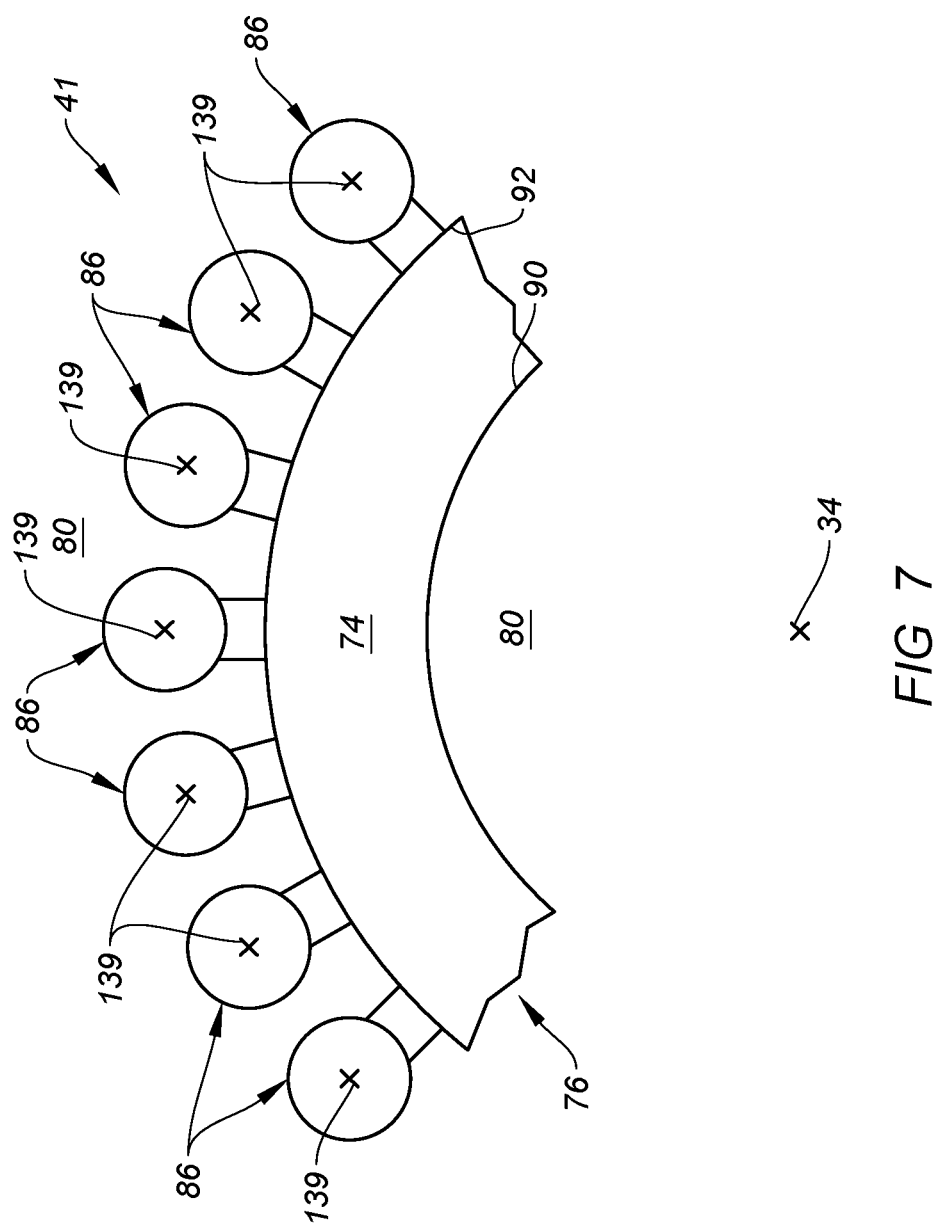
FIG. 7 is a partial schematic illustration of the combustor with multiple air-debris separators taken along line 7-7 in FIG. 5.

The air-debris separators 86 of FIG. 5 are located in the diffuser plenum 80. These air-debris separators 86 are located radially outboard of and may be next to the combustor 76 and its outer combustor wall 92. The air-debris separators 86 are arranged circumferentially about the axis 34 in an array; e.g., a circular array. This array of air-debris separators 86 axially overlaps and circumscribes the combustor 76 and its outer combustor wall 92; see also FIG. 7.

Figure 8:
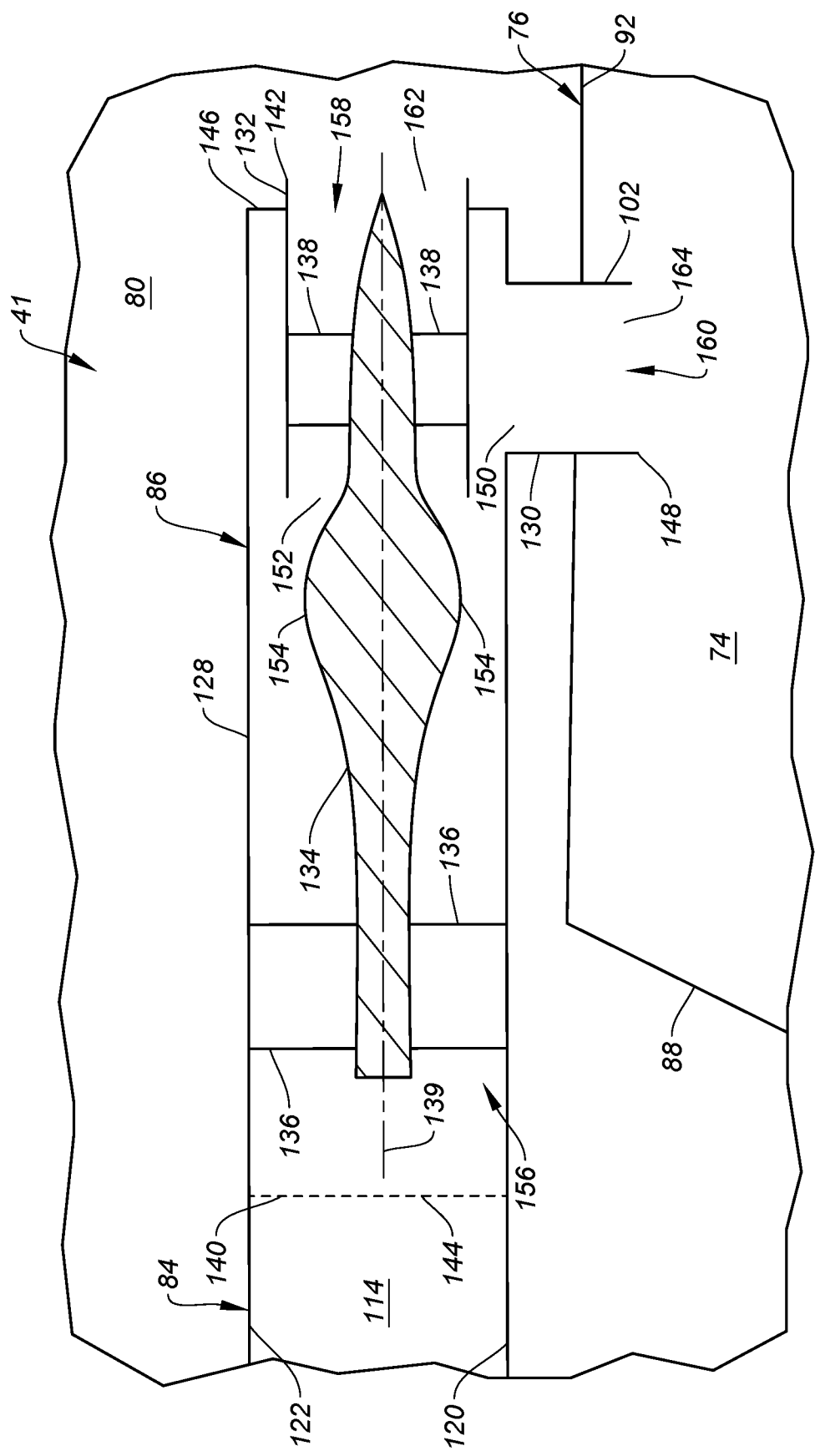
FIG. 8 is a schematic illustration of a portion of the aircraft system at a respective air-debris separator.

Referring to FIG. 8, each air-debris separator 86 may be configured as a cyclonic separator. Each air-debris separator 86 of FIG. 8, for example, includes an outer tube 128, an outlet tube 130, an inner tube 132 and a center body 134. Each air-debris separator 86 may also include one or more upstream vanes 136 and one or more downstream vanes 138. However, in other embodiments, the upstream vanes 136 may be omitted.

The outer tube 128 extends longitudinally along a longitudinal centerline 139 from an upstream end 140 of the respective air-debris separator 86 to a downstream end 142 of the respective air-debris separator 86. An inner bore of the outer tube 128 extends longitudinally within the outer tube 128 from an inlet 144 into the air-debris separator 86 at the separator upstream end 140 to an endwall 146 at (or near) the separator downstream end 142. Here, the separator inlet 144 is fluidly coupled to a respective separator passage outlet.

The outlet tube 130 is disposed outside of and is connected to the outer tube 128. The outlet tube 130 of FIG. 8, for example, projects radially out from a sidewall of the outer tube 128 towards the combustor 76 and to a respective one of the dilution apertures 102. Here, an inner bore of the outlet tube 130 fluidly couples the inner bore of the outer tube 128 to a respective one of the dilution apertures 102 and, thus, the combustion chamber 74 through the respective dilution aperture 102. While the outlet tube 130 of FIG. 8 is shown as projecting through the respective dilution aperture 102, it is contemplated a distal end 148 of the outlet tube 130 may alternatively be disposed at the respective dilution aperture 102 or may still alternatively be disposed next to, but spaced (e.g., slightly) radially out from the respective dilution aperture 102.

The inner tube 132 is disposed partially (or completely) within the inner bore of the outer tube 128. The inner tube 132 of FIG. 8, for example, projects longitudinally along the longitudinal centerline 139 through the separator endwall 146 and into the inner bore of the outer tube 128. Within the inner bore of the outer tube 128, a sidewall of the inner tube 132 may axially overlap (e.g., an entirety of) an inlet 150 into the inner bore of the outlet tube 130. Here, an inner bore of the inner tube 132 fluidly couples the inner bore of the outer tube 128 to the diffuser plenum 80.

The center body 134 is disposed within the inner bore of the outer tube 128 and the inner bore of the inner tube 132. An upstream portion of the center body 134, for example, is centered within and extends longitudinally within the inner bore of the outer tube 128. A downstream portion of the center body 134 is centered within and extends longitudinally within the inner bore of the inner tube 132. More particularly, the downstream portion of the center body 134 projects longitudinally along the longitudinal centerline 139 out from the outer tube 128 and into the inner tube 132 partially towards the respective separator downstream end 142. In the embodiments of FIG. 8, a portion of the center body 134 and its upstream portion at and/or upstream of an inlet 152 into the inner bore of the inner tube 132 may include an annular convexity 154 (e.g., a hump) which projects radially out towards, but is (e.g., slightly) spaced from, the sidewall of the outer tube 128.

The upstream vanes 136 are disposed within the inner bore of the outer tube 128. These upstream vanes 136 are arranged circumferentially about the center body 134 in an array; e.g., a circular array. Each of the upstream vanes 136 may project radially out from the center body 134 to the sidewall of the outer tube 128. These upstream vanes 136 may thereby connect the center body 134 to the outer tube 128. In addition, the upstream vanes 136 may be configured to impart (e.g., additional) swirl to air flowing within the inner bore of the outer tube 128.

The downstream vanes 138 are disposed within the inner bore of the inner tube 132. These downstream vanes 138 are arranged circumferentially about the center body 134 in an array; e.g., a circular array. Each of the downstream vanes 138 may project radially out from the center body 134 to the sidewall of the inner tube 132. These downstream vanes 138 may thereby connect the center body 134 to the inner tube 132. In addition, the downstream vanes 138 may be configured to condition (e.g., de-swirl, straighten out) the swirling air received from the inner bore of the outer tube 128.

With the air-debris separator arrangement of FIG. 8, each air-debris separator 86 includes an inlet airflow passage 156, a clean airflow passage 158 and a dirty airflow passage 160. The inlet airflow passage 156 extends longitudinally within the outer tube 128 from the separator inlet 144, along the center body 134, to a distal interior end of the inner tube 132. The clean airflow passage 158 extends longitudinally from the inlet airflow passage 156, through the inner tube 132 and along center body 134, to a clean airflow outlet 162 from the respective air-debris separator 86. This clean airflow outlet 162 is fluidly coupled with the diffuser plenum 80. An upstream portion of the dirty airflow passage 160 is formed radially between the inner tube 132 and the outer tube 128, and is fluidly coupled with the inlet airflow passage 156. A downstream portion of the dirty airflow passage 160 extends from the upstream portion of the dirty airflow passage 160, through the outlet tube 130, to a dirty airflow outlet 164 from the respective air-debris separator 86. Each air-debris separator 86 may thereby fluidly couple a respective one of the dirty airflow passage 160 to a respective one of the dilution aperture 102/the combustion chamber 74 and the diffuser plenum 80.

During operation of the air system 82 of FIG. 5, each of the diffuser passages 114 receives compressed core air from the HPC section 40B. Under certain conditions, this core air may include debris such as, but not limited to, dirt, sand or other foreign particulate matter ingesting into the turbine engine 26. The configuration of the HPC rotor 54 and its final mixed flow compressor stage 56B directs the compressed core air radially outward and circumferentially into each diffuser passage 114. Momentum of this compressed core air entering the respective diffuser passage 114 may cause that compressed core air to swirl as it moves through the respective diffuser passage 114 and into the respective air-debris separator 86. Referring to FIG. 8, within the respective air-debris separator 86, the incoming compressed core air is swirled around the center body 134. This swirling may cause the relatively heavy debris entrained within the swirling compressed core air to move towards/to the sidewall of the outer tube 128 while the lighter clean air may flow closer to and along the center body 134. The debris along with a portion of the core air flows into the dirty airflow passage 160, and the dirty airflow passage 160 directs that dirty air into the combustion chamber 74 through the respective dilution aperture 102. The clean air, by contrast, flows into the clean airflow passage 158 and is directed into the diffuser plenum 80 after being conditioned (e.g., de-swirled) by the downstream vanes 138. The clean air within the diffuser plenum 80 may then be directed into the combustion chamber 74 through air swirlers, cooling apertures and the like, and/or provided to other components of the turbine engine 26 (e.g., the stator vane array 96, the blades of the HPT rotor 58 of FIG. 1, etc.) for cooling. With this arrangement, the dirty air and its debris is directed through a relatively large openings—the respective dilution apertures 102. The clean air, on the other hand, may flow through smaller apertures/passages; e.g., air swirler passages, combustor wall cooling apertures, etc. Since the clean air includes little or no debris, the foregoing separation of the debris may reduce likelihood of debris accumulating on an engine component and clogging its relatively small apertures/passages. In addition, the mixed flow compressor stage 56B in the HPC rotor 54 may replace multiple traditional axial flow compressor stages thereby reducing an overall length of the turbine engine 26 and its engine core 24.

Figure 9:
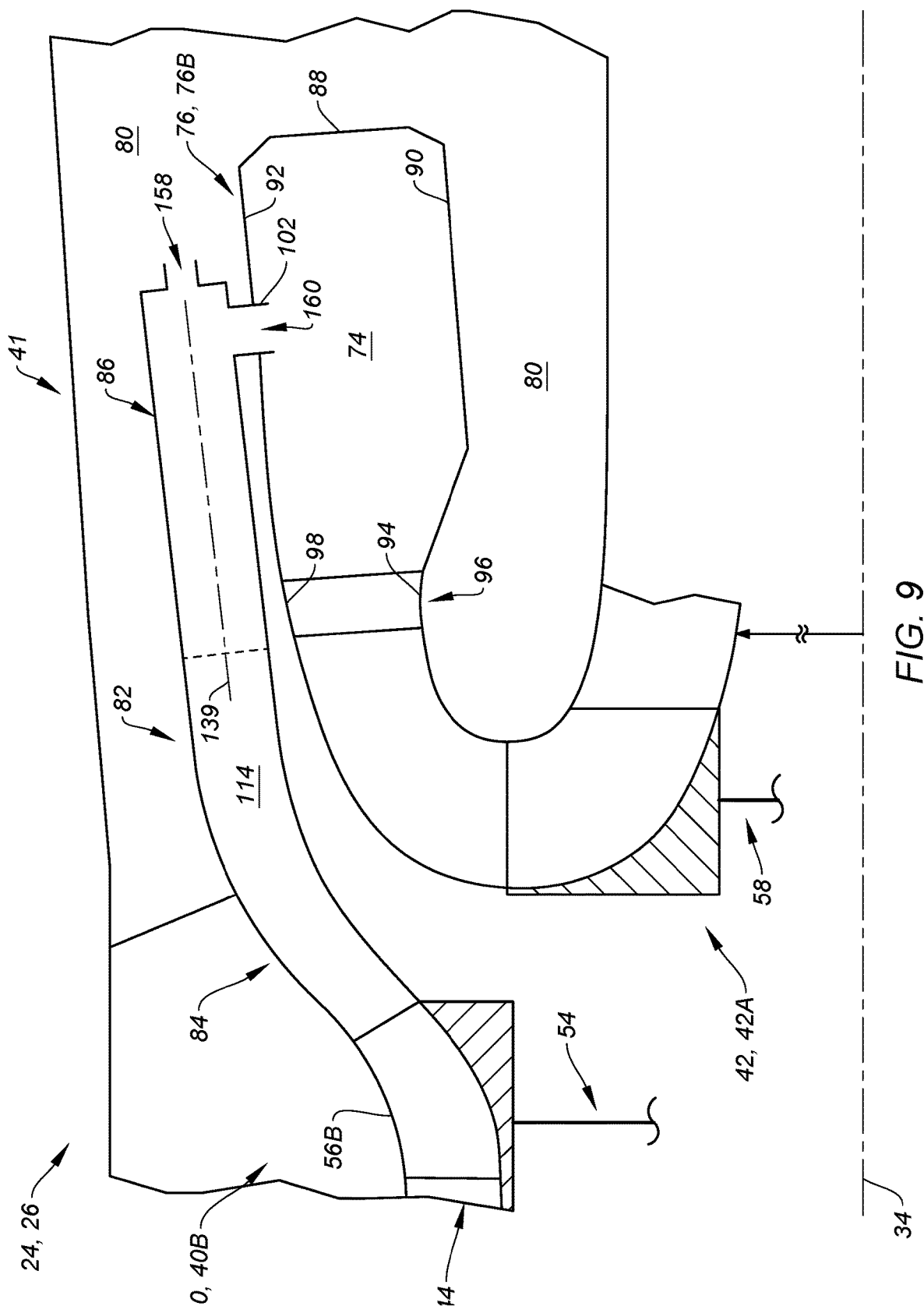
FIG. 9 is a schematic illustration of a portion of the aircraft system at the air system with a reverse flow combustor.

In some embodiments, referring to FIG. 2, the air system 82 may be configured with an axial flow combustor 76A. With this arrangement, the bulkhead wall 88 is located axially between the combustion chamber 74 and the HPC section 40B and its HPC rotor 54. In other embodiments, referring to FIG. 9, the air system 82 may alternatively be configured with a reverse flow combustor 76B. With this arrangement, the combustion chamber 74 is located axially between the bulkhead wall 88 and the HPC section 40B and its HPC rotor 54. The present disclosure, of course, is not limited to such exemplary combustor configurations. For example, while the air system 82 is generally described above paired with annular combustors and annular combustion chambers, it is contemplated the air system 82 may be configured for various other types of combustors such as a CAN-type combustor with a non-annular (e.g., cylindrical or frustoconical) combustion chamber.

While the air system 82 is described above as directing the dirty air with the debris into the combustion chamber 74, it is contemplated this dirty air may also or alternatively be routed to other destinations. For example, the air system 82 may be configured to also (or alternatively) vent the dirty air outside of the engine core 24; e.g., into a bypass flowpath.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
    an engine core extending axially along an axis, the engine core including a compressor section, a combustor, a diffuser structure, a diffuser plenum and a plurality of separators;
    the combustor arranged within the diffuser plenum, and the combustor including a combustion chamber and a combustor wall between the combustion chamber and the diffuser plenum;
    the diffuser structure including a plurality of diffuser passages, and each of the plurality of diffuser passages fluidly coupling the compressor section to a respective one of the plurality of separators; and
    each of the of the plurality of separators including a first outlet into the diffuser plenum and a second outlet into the combustion chamber, the plurality of separators comprising a first separator, and the first separator arranged in the diffuser plenum radially outboard of the combustor.

2. The assembly of claim 1, wherein
    the compressor section comprises a mixed flow compressor rotor; and
    the mixed flow compressor rotor is configured to output compressed air, along a trajectory with an axial component and a radial outward component, into the plurality of diffuser passages.

3. The assembly of claim 1, wherein each of the plurality of diffuser passages projects radially outward away from the compressor section.

4. The assembly of claim 1, wherein
    the plurality of diffuser passages comprises a first diffuser passage;
    the first separator is configured to separate compressed core air received from the compressor section through the first diffuser passage into a first airflow and a second airflow;
    the first separator is configured to direct the first airflow into the diffuser plenum through the first outlet; and
    the first separator is configured to direct the second airflow into the combustion chamber through the second outlet.

5. The assembly of claim 4, wherein, when the compressed core air received by the first separator from the compressor section includes debris, the first separator is configured to divert at least a majority of the debris away from the first airflow and into the second airflow to flow with the second airflow into the combustion chamber through the second outlet.

6. The assembly of claim 1, wherein
    the first separator includes a center body, an inner tube, an outer tube, a first airflow passage and a second airflow passage;
    an upstream portion of the center body extends longitudinally in a bore of the outer tube, and a downstream portion of the center body projects longitudinally into a bore of the inner tube;
    the outer tube extends longitudinally along and circumscribes the inner tube;
    the first airflow passage is formed within the inner tube, and the first airflow passage is fluidly coupled to the diffuser plenum through the first outlet; and
    the second airflow passage is formed between the inner tube and the outer tube, and the second airflow passage is fluidly coupled to the combustion chamber through the second outlet.

7. The assembly of claim 6, wherein the first separator further includes one or more vanes connecting the center body to the outer tube.

8. The assembly of claim 6, wherein the first separator further includes one or more vanes connecting the center body to the inner tube.

9. The assembly of claim 1, wherein the combustor further comprises a bulkhead disposed axially between the compressor section and the combustion chamber.

10. The assembly of claim 1, wherein the combustor further comprises a bulkhead with the combustion chamber disposed axially between the compressor section and the bulkhead.

11. The assembly of claim 1, further comprising a propulsor rotor operatively coupled to the engine core.

12. An assembly for a turbine engine, comprising:
    an engine core extending axially along an axis, the engine core including a compressor section, a combustor, a diffuser structure, a diffuser plenum and a plurality of separators;
    the combustor arranged within the diffuser plenum, and the combustor including a combustion chamber and a combustor wall between the combustion chamber and the diffuser plenum;
    the diffuser structure including a plurality of diffuser passages, and each of the plurality of diffuser passages fluidly coupling the compressor section to a respective one of the plurality of separators; and each of the of the plurality of separators including a first outlet into the diffuser plenum and a second outlet into the combustion chamber;

wherein the plurality of separators comprises a first separator; and wherein the first separator is configured as a cyclonic separator.

13. An assembly for a turbine engine, comprising:

an engine core extending axially along an axis, the engine core including a compressor section, a combustor, a diffuser structure, a diffuser plenum and a plurality of separators;

the combustor arranged within the diffuser plenum, and the combustor including a combustion chamber and a combustor wall between the combustion chamber and the diffuser plenum;

the diffuser structure including a plurality of diffuser passages, and each of the plurality of diffuser passages fluidly coupling the compressor section to a respective one of the plurality of separators; and each of the of the plurality of separators including a first outlet into the diffuser plenum and a second outlet into the combustion chamber;

wherein the combustor wall includes a plurality of dilution apertures extending through the combustor wall to the combustion chamber; and wherein each of the plurality of separators includes an outlet tube mated with a respective one of the plurality of dilution apertures, and wherein the outlet tube comprises the second outlet.

* * * * *